US010821703B1

(12) United States Patent
Dinh-Sybeldon

(10) Patent No.: US 10,821,703 B1
(45) Date of Patent: Nov. 3, 2020

(54) ADDITIVE TRANSFERRING FILM

(71) Applicant: Viskase Companies, Inc., Lombard, IL (US)

(72) Inventor: Ann Dinh-Sybeldon, Woodridge, IL (US)

(73) Assignee: Vikase Companies, Inc., Lombard, IL (US)

(*) Notice: Subject to any disclaimer, the term of this patent is extended or adjusted under 35 U.S.C. 154(b) by 1021 days.

(21) Appl. No.: 14/749,267

(22) Filed: Jun. 24, 2015

Related U.S. Application Data

(60) Provisional application No. 62/018,380, filed on Jun. 27, 2014.

(51) Int. Cl.
*B32B 7/02* (2019.01)
*B32B 27/32* (2006.01)
*B32B 27/08* (2006.01)
*B32B 27/18* (2006.01)
*B32B 7/12* (2006.01)
*B32B 27/34* (2006.01)
*B32B 27/36* (2006.01)

(52) U.S. Cl.
CPC .................. *B32B 7/02* (2013.01); *B32B 7/12* (2013.01); *B32B 27/08* (2013.01); *B32B 27/18* (2013.01); *B32B 27/32* (2013.01); *B32B 27/34* (2013.01); *B32B 27/36* (2013.01); *B32B 2307/7244* (2013.01); *B32B 2307/7246* (2013.01); *B32B 2307/746* (2013.01); *B32B 2439/40* (2013.01); *B32B 2439/70* (2013.01)

(58) Field of Classification Search
CPC ............ B32B 7/02; B32B 27/32; B32B 27/34
See application file for complete search history.

(56) References Cited

U.S. PATENT DOCUMENTS

| | | |
|---|---|---|
| 2,424,346 A | 7/1947 | Wilcoxon |
| 2,514,660 A | 7/1950 | McClure et al. |
| 2,686,927 A | 8/1954 | Grey |
| 2,757,409 A | 8/1956 | Parkes et al. |
| 2,901,358 A | 8/1959 | Underwood et al. |
| 3,106,471 A | 10/1963 | Firth |
| 3,158,492 A | 11/1964 | Firth |
| 3,307,956 A | 3/1967 | Chiu et al. |
| 3,312,995 A | 4/1967 | Garey |
| 3,442,663 A | 5/1969 | Turbak |
| 3,456,044 A | 7/1969 | Pahlke |
| 3,487,499 A | 1/1970 | Klyce |
| 3,558,331 A | 1/1971 | Tarika |
| 3,608,973 A | 9/1971 | Klyce |
| 4,104,408 A * | 8/1978 | Chiu .................... A23L 27/27 426/135 |
| 4,250,211 A | 2/1981 | Damrau et al. |
| 4,377,187 A * | 3/1983 | Chiu .................. A22C 13/0013 138/118.1 |
| 4,442,868 A * | 4/1984 | Smith ................ A22C 13/0013 138/118.1 |
| 4,717,576 A * | 1/1988 | Nicholson .......... A22C 13/0013 426/533 |
| 4,877,626 A * | 10/1989 | Ande ........................ A23L 5/42 426/250 |
| 5,264,277 A * | 11/1993 | Frognet .................... B32B 27/18 264/210.7 |
| 5,296,170 A | 3/1994 | Noritsugu et al. |
| 5,447,792 A * | 9/1995 | Brandt .................... B32B 27/32 428/349 |
| 5,558,930 A * | 9/1996 | DiPoto ..................... B29D 7/01 428/214 |
| 5,562,958 A * | 10/1996 | Walton ................ B29C 47/0004 428/34.9 |
| 5,955,126 A * | 9/1999 | Jon .................... A22C 13/0013 426/105 |
| 6,196,960 B1 * | 3/2001 | Owensby .............. B65B 25/065 383/117 |
| 6,200,613 B1 | 3/2001 | Schaefer et al. |
| 6,299,917 B1 * | 10/2001 | Appleby ............ A22C 13/0013 426/105 |
| 6,455,150 B1 * | 9/2002 | Sheppard ................ B32B 27/32 156/244.11 |
| 7,310,926 B2 | 12/2007 | Nikoley et al. |
| 7,392,642 B2 | 7/2008 | Topfer |
| 7,544,118 B2 | 6/2009 | Mysker et al. |
| 7,556,845 B2 * | 7/2009 | Samuels ................. A22C 13/00 428/34.1 |
| 2002/0004088 A1 * | 1/2002 | Miller ................ A22C 13/0013 426/135 |
| 2003/0039814 A1 * | 2/2003 | Bader ..................... B32B 27/32 428/213 |
| 2003/0054075 A1 * | 3/2003 | Dinh-Sybeldon ......................... A22C 13/0013 426/132 |
| 2003/0203229 A1 * | 10/2003 | Aral ...................... A01N 25/34 428/515 |
| 2003/0211350 A1 * | 11/2003 | Migliorini ............... B32B 27/08 428/515 |
| 2004/0047951 A1 * | 3/2004 | Johansson .......... A22C 13/0013 426/105 |
| 2004/0115453 A1 * | 6/2004 | McAllister, Jr. ..... B29C 47/0026 428/484.1 |
| 2004/0151934 A1 * | 8/2004 | Schwark ................. B32B 27/18 428/518 |

(Continued)

FOREIGN PATENT DOCUMENTS

JP 02-069131 A 3/1990

OTHER PUBLICATIONS

Henderson (IEEE Electrical Insulation Magazine, vol. 9(1), 30-38).*

*Primary Examiner* — Liam J Heincer
(74) *Attorney, Agent, or Firm* — TraskBritt; Donna Bobrowicz

(57) ABSTRACT

The present invention relates to a multilayered, low moisture, barrier, thermoplastic film with an first outer food contact layer corona discharge treated and coated with an aqueous flavoring and/or coloring agent, which can be formed into a sealed tube on automatic form and fill machinery in a continuous manner for use as a tubular food casing. The coloring and/or flavoring agent on the inner layer of the tubular casing is released onto the surface of encased foodstuff during cooking and processing.

20 Claims, No Drawings

(56) References Cited

U.S. PATENT DOCUMENTS

| | | | |
|---|---|---|---|
| 2004/0180162 A1* | 9/2004 | Gringoire | C08J 7/047 428/35.7 |
| 2005/0129813 A1* | 6/2005 | Koenig | A22C 13/0013 426/135 |
| 2006/0057258 A1* | 3/2006 | Dinh-Sybeldon | A22C 13/0013 426/135 |
| 2006/0068200 A1* | 3/2006 | Cleckner | B32B 27/08 428/347 |
| 2006/0177650 A1* | 8/2006 | Chang | B32B 27/08 428/336 |
| 2006/0233982 A1* | 10/2006 | Jaeger | A22C 13/0013 428/34.8 |
| 2006/0233985 A1* | 10/2006 | Pockat | A23B 4/18 428/34.9 |
| 2006/0246242 A1* | 11/2006 | Siegel | A23B 4/10 428/34.1 |
| 2007/0014953 A1* | 1/2007 | Siegel | A23B 4/14 428/35.7 |
| 2007/0020472 A1* | 1/2007 | Mills | B32B 27/18 428/515 |
| 2007/0202222 A1* | 8/2007 | Koenig | A22C 13/0013 426/135 |
| 2007/0275134 A1* | 11/2007 | Siegel | A23B 4/16 426/129 |
| 2008/0026112 A1* | 1/2008 | Mori | A22C 13/0013 426/106 |
| 2008/0226853 A1* | 9/2008 | Bueker | A22C 13/0013 428/34.8 |
| 2009/0130438 A1* | 5/2009 | Nassi | B32B 27/32 428/336 |
| 2009/0155430 A1* | 6/2009 | Lee | A22C 13/0013 426/284 |
| 2011/0076367 A1* | 3/2011 | Auf der Heide | A22C 13/0013 426/135 |
| 2011/0236539 A1* | 9/2011 | Foegler | A22C 13/0013 426/105 |
| 2011/0293862 A1* | 12/2011 | Schiffmann | B32B 1/08 428/34.8 |
| 2012/0028014 A1* | 2/2012 | Koehn | B29C 47/065 428/213 |
| 2012/0244327 A1* | 9/2012 | Hernandez | B32B 7/02 428/213 |
| 2013/0309426 A1* | 11/2013 | Thai | C08L 23/10 428/35.2 |

* cited by examiner

ADDITIVE TRANSFERRING FILM

CROSS-REFERENCE TO RELATED APPLICATION

This application claims the benefit of U.S. Provisional Application Ser. No. 62/018,380, filed Jun. 27, 2014.

FIELD OF THE INVENTION

The present invention relates to a multilayered, low moisture, barrier, thermoplastic film having a food contact surface coated with an additive, such as a flavoring and/or coloring agent, which can be continuously formed on automatic machinery into a sealed tube for use as a food casing. This film comprises at least an oxygen barrier layer and a surface activation treated inner, food contacting olefin layer. The coloring and/or flavoring agent is released from the surface of the inner layer onto the surface of encased foodstuff during cooking and processing.

BACKGROUND OF THE INVENTION

Tubular films are used as sausage casings for processing and packaging sausages, including water or steam cooked sausages. They are also used to process and package various types of deli cuts of meats, such as those made from chicken, beef, and ham. One particularly typical film is made from regenerated cellulose, where viscose is extruded through an annular die into a coagulating and regenerating bath to produce a tube of regenerated cellulose, as is well-known in the art. This tube is subsequently washed, plasticized, e.g., with glycerin, and can be impregnated with a water-soluble, casing-permeable flavorant or colorant, and dried while inflated under substantial air pressure. After drying, this cellulose "nonfibrous" casing is wound on reels and subsequently pleated, or "shirred", on high speed shirring machines. Nonfibrous casings are typically used to process small diameter sausages including polish sausages, wieners, or frankfurters. This type of casing is generally removed from the sausages after processing.

Colorants and/or flavorants are introduced into the interior of the tubing during the manufacturing process, particularly by slugging or spraying. These additives are provided to color and/or flavor the foodstuff processed within. In particular, production of smoked or browned sausages or meats has been accomplished through the use of casings containing liquid smoke or caramel, which transfers to the surface of the encased meat product during processing.

Historically, colorants and flavorants have been applied to various foodstuffs, such as sausage and cheese surfaces, by various means. For example, sausages have been colored and/or flavored by smoking with gaseous or liquid wood smoke; by dipping peeled sausages into a vat containing a colorant; by spraying or dipping encased sausages with a casing-permeable liquid dye and/or flavorant; and by stuffing sausage meat into casings having their interior surfaces coated with a transferable colorant. Use of self-coloring cellulosic casings made with synthetic colorants was approved by the United States Department of Agriculture in 1947 and such casings have been commercially available since 1948. In different regions of the world and for various products, different colors range in popularity and some colorants may impart flavor as well as color. Examples of colorants and flavorants are found in U.S. Pat. Nos. 5,955,126 and 4,877,626.

Another type of casing, fibrous casing, is made by folding a flat paper or textile so that the opposing side edges overlap and form a tube, while extruded viscose is applied onto one or both sides of the tube. The viscose impregnates the supporting tube and when it coagulates and is regenerated, a fiber-reinforced tube of regenerated cellulose is produced. As with the nonfibrous casing above, flavorings and colorants can be introduced by slugging or spraying them into the interior or onto the exterior of the casing. Fibrous casings generally have diameters of about 40 mm or more and provide dimensional stability, particularly during stuffing with meat emulsion, such as deli meats.

Production of both nonfibrous and fibrous casing is well-known in the art. Fibrous casings made with additional outer layers of various materials, such as plastics, provide desired air and/or water barrier properties. One well-known way to provide barrier protection to the interior of the casing is through the application of liquid polyvinylidene chloride ("PVDC"), which upon drying hardens to a self-sustaining layer that can be removed from the fibrous casing. Examples of these types of casings are found in Chui, U.S. Pat. No. 4,377,187, Smith, U.S. Pat. No. 4,442,868, and Owensby, U.S. Pat. No. 6,196,960. A commercially available fibrous casing of this type is sold by Viskase Companies, Inc., of Darien, Ill., USA, under the registered trademark "MP®".

Another type of casing, multilayered thermoplastic casing, can be made a number of ways, including lamination and extrusion lamination. These methods include producing flat sheets of film and using adhesives to glue the sheets together, or through the coextrusion of a multilayer tube which is ultimately slit to form flat sheets. To form a casing from flat sheets of film, the flat film is formed into a tube and sealed closed by various methods, such as by overlapping the ends of the tube and heat-sealing them together, or by using adhesives, or by applying a tape over the abutted edges and sealing it with adhesives or by welding the tape over the seam with heat. Multilayered laminated films are produced by placing layers of various materials, such as nylons, polyethylenes, papers, ethylene vinyl acetates, and ethylene vinyl alcohols, to name a few, adjacent to each other, with or without the use of adhesives, in order to produce films with various desired properties. The use of these various types of films are well-known to those having skill in the art of making films.

Multilayered thermoplastic films also can be made by extrusion lamination where the thermoplastic layer is extruded through a slot die directly onto the adhesive layer, or onto other plastic layers. Multilayered tubular films can also be made by coextruding each layer through an annular die and subjecting the resulting hot tube to an orienting and stretching process, well known to those skilled in the art. Multilayer tubes can then be slit to form flat sheets of film or remain as tubes. Monolayer films and tubes can be extruded the same ways. These methods are well known in the art.

If the inner layer of the formed tube is an absorbent layer, such as a paper, colorants and/or flavorants can be introduced to this layer. Generally speaking, plastic films do not lend themselves to accepting colorants and/flavorants, and if they do, as certain polyamides have the ability to absorb a small of amount of colorants and/or flavorants, the flavor or color transmitted to the encased food product is very light in color and/or splotchy. In U.S. Pat. No. 7,556,845, Samuels claims a film that has an inner polyamide layer that is treated with a surface activation treatment known as "corona" treatment prior to the addition of a colorant/flavorant, and describes how this additive is partially absorbed into the polyamide layer and then released to some small degree during the processing of the encased meat. The additive not released remains in the film layer. Other films using specific polymers to allow the transfer of liquid smoke or other flavoring agents through the plastic film are described in, for example, U.S. Pat. No. 6,200,613 and Japanese application H2-69131.

Corona discharge treatment of thermoplastics has been used for a number of reasons, such as to increase the ability of the film to adhere to the surface of enclosed meats, thereby decreasing the amount of liquid, or "purge", that accumulates during meat cooking cycles; to increase adherence of the film to the surface of raw meats, such as cuts of meat found in the retail grocery stores; and to increase the adherence of inks used in printing to the film. Corona discharge treatment is primarily done on flat film surfaces. However, Noritsugu et al. in U.S. Pat. No. 5,296,170, teaches a method of corona treating the inside of a tubular plastic film laminate in order to improve the wetting tension of the film so that the film clings more strongly to the surface of encased meat, while others knowledgeable in the art have corona treated the inner surface of thermoplastic tubular casings in order to improve adhesion of the casing to the encased meats.

An important property of multilayered film is that it must not delaminate upon handling or cooking, and in particular, when being peeled off of cooked food product. It is extremely disadvantageous to have a layer of plastic left on the skin of a cooked sausage as the product is then unfit for consumption. Also, the film must maintain high strength and low elongation properties. It must be sealable, and the seal must withstand processing conditions. Additional features needed for films that provide flavor or color to the encased food include the ability of the food contact surface of the film to absorb or have adhered to it adequate amounts of the additives, such as liquid smoke or caramel, that are then transferred to the encased food product to deliver the specific taste or color. Certain properties, including water and oxygen barriers, are also desired in order to maintain water levels in the cooked product to minimize weight loss and to give the product a longer shelf life if stored with the casing or film left on.

The casings described above can be provided to the food processor in a "shirred" form. Shirring is a method of pleating a long piece of flat casing into a much smaller tube, called a "stick". For examples, a shirred stick of nonfibrous, small-bored casing that measures about 24 inches in length can contain about 265 feet of casing. Another example is a one-meter long shirred stick of a multilayered laminated casing containing an absorbent inner surface that contains approximately 200 feet of flat casing. These sticks are placed on automatic stuffing machines whereby the sticks are held in place and the foodstuff, in particular sausage emulsions, are introduced under high speed and pressure into the interior of the stick, deshirring the stick and forming the sausages. Larger bore casings are used on machines that encase processed and formed meats, hams, or other whole muscle meats, as well as various deli-type meats. These casings are removed after cooking and the processed meats can be automatically sliced and packaged for sale to the ultimate consumer. Problems with the sticks that cause downtime in manufacturing operations include jamming in the automatic machines and/or the sticks breaking in the hopper that places the sticks into position on the machine to be stuffed. Also, because of the relatively short length of these deshirred sticks, it would be an improvement to be able to provide much longer lengths of casing to the manufacturer, thereby decreasing downtime of the machines as they continually replace used-up casing sticks.

Alternatively, flat film is also used in automatic sausage manufacture. Currently there are machines available in the market that will take a flat piece of film, slide it over a horn or shoulder that curves the flat film, turns it into a tube, and seals together the two edges of the film with a sealing strip of thermoplastic film, forming a tubular casing. In particular, Poly-Clip System Corp. of Mundelein, Ill., USA, and Tipper-Tie of Apex, N.C., USA, produce these types of sealing, stuffing, and clipping machines known as "form and fill" machines. Descriptions of some of these machines can be found in U.S. Pat. Nos. 7,392,642, 7,310,926, and 7,544,118, which are all hereby incorporated by reference. Polyethylene thermoplastic films are particularly used on these machines. As these casings are made, they are stuffed with a meat emulsion, and the products are processed to completion.

The films available for this type of machinery have certain specifications, including low moisture levels and the ability to withstand the high temperatures needed to weld-seal the casing. The primary benefit of this type of casing is the ability to produce many more sausages per length of film, reducing the downtime due to problems with shirred sticks. Some of these machines can handle 3,000 foot rolls of flat film before needing to have the film replenished.

Generally, films that contain a flavorant and/or colorant on their absorbent, interior surface have high moisture levels that range from greater than 30% by weight up to about 60% by weight. It is not possible to use these high moisture level-containing films on form and fill machines as the moisture content interferes with the traction of the film through the machine and causes the film to jam. These films are very tacky, with a high kinetic coefficient of friction, causing them to catch on the shoulder apparatus, preventing the formation of a tube from the flat film. What is needed in the industry is a low-moisture, flavor and/or color-containing, multilayered flat film that can be provided in large quantities, thereby substantially increasing the number of foodstuffs that can be made on automatic machines as compared to those using sticks of casing.

SUMMARY OF THE INVENTION

The present invention provides a solution to the above described problems of flavor and/or colorant-containing flat films needed for use on automatic form and fill machines in highly automated sausage making plants. The invention is a low-moisture, multilayered, thermoplastic film, containing a releasable additive such as a flavorant and/or a colorant on its food contacting layer, particularly for use on automated machines that continuously turn the flat film into tubular casing. The food contact layer, which is a thermoplastic, but not a nylon, is treated with a surface activation treatment, preferably by corona discharge, prior to having the releasable additive applied to this inner layer (also known as the first outer thermoplastic layer when the film is in its flat form). This film has a kinetic coefficient of friction such that the outer layers of the film slide easily over the shoulder of the form and fill machine as it is being formed into a tube. It also has sufficient tensile strength in both the machine and transverse directions to withstand handling conditions during the cooking and handling process. This casing, when stuffed with foodstuff, in particular sausage or whole meat emulsions, releases its flavorant and/or colorant onto the surface of the encased food during the processing of these foods, producing a flavored and/or colored final product.

The film of the present invention is a multilayered thermoplastic film comprising a first outer non-nylon thermoplastic layer, a second inner thermoplastic layer, and a third outer thermoplastic layer; wherein said second inner thermoplastic layer comprises an oxygen barrier and said third outer thermoplastic layer comprises a moisture barrier and abuse-resistant layer; wherein said first thermoplastic layer is treated by surface activation and additionally comprises an aqueous solution selected from the group consisting of a coloring solution, a flavoring solution, and a coloring and flavoring solution; wherein the Kinetic Coefficient of Friction of said third outer thermoplastic layer to metal is a maximum of 0.500 lbs, the Kinetic Coefficient of Friction of said first outer thermoplastic layer to metal is a maximum of 0.500 lbs., and the Kinetic Coefficient of Friction of said first outer thermoplastic layer to the third outer thermoplastic layer is a maximum of 0.500 lbs.; and wherein said film has a finished moisture level from about 2.0 wt. % to about 5.0 wt. %.

One example of the inventive film is a low-moisture, multilayered, thermoplastic film of at least five layers having the following structure: a first outer layer of polyethylene, a first adhesive layer, a layer of polyamide, a second adhesive layer, and a second outer layer of polyethylene. Either of the outer polyethylene layers can be the inner, or food contact, layer in the casing ultimately made from this film. This structure may also be shown as the following, from the first outer layer through the second outer layer: PE/adh/PA/adh/PE (polyethylene/adhesive/polyamide/adhesive/polyethylene). Once this film is formed into a tube, the first polyethylene layer becomes the innermost layer while the fifth layer, the other polyethylene layer is the outermost layer. This film can be formed into a tube and sealed shut either by heat-welding an overlapped seam or by using a sealing tape. Other examples of the present invention are low-moisture, multilayered, coextruded laminated films having two or three layers. A two layered film of polyethylene and polyamide would be sealed into a tube with a tape seal, while a three layered, flat, coextruded laminate film of polyethylene/polyamide/polyethylene would not need to have adhesive layers, and could be sealed into a tube with an overlapping seam.

A preferred embodiment of the present invention is a low-moisture, multilayered, thermoplastic film with at least five layers comprising a polyethylene layer, an adhesive layer, a layer of bioriented nylon 6, an adhesive layer, and a layer of polyethylene.

A particularly preferred embodiment of the present invention is a low-moisture, multilayered, thermoplastic film having layers of a polyethylene, an adhesive layer, a layer of bioriented nylon 6, an adhesive layer, and an outer layer of a polyethylene, with the polyethylene layers being selected from the group consisting of low density polyethylene having a density from about 0.924 to about 0.925 g/cm$^3$, linear low density polyethylene having a density of about 0.916 g/cm$^3$, and a blend of low density and linear low density polyethylenes. Additional layers may be added to the inventive film to provide additional features to the film, such as increased oxygen or moisture barrier properties, or to add strength to the film. Prior to coating the innermost food contact layer with an additive, it is treated with corona discharge, a surface activation treatment, to a surface energy of less than 50 Dynes, but within a range of about 10 to about 55% increase in Dyne value over the value of the base film layer that has had no surface activation treatment. This treatment is a preferred treatment but other surface activation treatments are well known in the art and are acceptable for this inventive film.

Once the flat film is made, the ultimate food contact, or inner, polyethylene layer of the film is coated with a solution of a peeling aid, liquid smoke and/or caramel, or other aqueous additives, and/or mixtures of these flavorants and colorants. Although many flavoring/colorant solutions used in the industry are known, and many contain binding agents to help the liquid smoke or caramel adhere to the surface of the film, no such binder is needed in this invention. The coating solution may be applied to the inventive film in a number of well-known ways, such as by spraying, by blade coating, by roll-coating, by rotogravure, or by printing. In particular, the rotogravure method is preferred. Once the coating is applied the film is dried to a finished moisture level of less than about 5%, particularly between from about 2.0% to about 5.0% by weight. Another surprising aspect of this invention is the fact that the flavoring/colorant solutions may be applied from edge-to-edge on the film and the flat film may be successfully seamed right through the coating, a property not seen with other coated plastic films.

Kinetic coefficients of friction of plastic film is determined when sliding over itself or over another substance. The coefficients of friction are related to the slip properties of plastic films. In the present invention, three kinetic coefficients of friction ("KCOF") are measured, and certain levels must be met. The desired KCOF of the inner layer coated with the colorant and/or flavorant additive to the metal (of the turning shoulder of the form and fill machine) has a maximum of 0.500 lbs. The desired KCOF of the outer thermoplastic layer to metal (important when the flat film is turned into a sleeve, or tube, and held under a metal collar of the machine), is a maximum of 0.500 lbs. The desired KCOF of the two outer layers to each other has a maximum of 0.500 lbs.

The inventive film is fed into the form and fill machine, formed into a tube, and sealed with a strip of laminate. One example of a sealing strip is a strip made of polyethylene. A preferred sealing strip is made of the same component layers as is the film, such as the preferred polyethylene/adhesive/bioriented nylon 6/adhesive/polyethylene film. The outer polyethylene layer of the sealing strip is the same polyethylene as is used in the film. This sealing strip is applied with its polyethylene side placed against the outer polyethylene layer of the formed tube, and welded with heat to create an abutted or overlapped seam. At this point, the casing may be automatically stuffed with food product and further processed.

The inventive film may also be made as an extruded multilayered tube wherein the inner surface is surface activated and then an additive aqueous solution is introduced into the interior of the casing, which is then dried to the desired moisture level described above and which can then be shirred into sticks of casing.

DETAILED DESCRIPTION OF THE INVENTION

The inventive film is a multilayered, low-moisture, thermoplastic, barrier film wherein the first outer thermoplastic layer is not a nylon, coated with an additive, such as a flavoring and/or a coloring agent, preferably with at least five layers having the following structure: a first outer non-nylon thermoplastic layer (also called the "inner layer" or "food contact layer" when this flat film is turned into a tubular film), a second inner adhesive layer, a third inner thermoplastic oxygen barrier layer, a fourth inner adhesive layer, and a fifth outer thermoplastic moisture barrier and abuse-resistant layer (also called the "outer layer" of the resulting formed tube). It is represented as follows from inner to outer layer: inner/adhesive/oxygen barrier/adhesive/moisture barrier.

Throughout this document, descriptions of the multilayer structure of the inventive film are to be read from left to right, where the first outer layer, which when the flat film is turned into a tube becomes the inner, food contacting layer, continuing through the inner layer(s) to the outer layer of the film, i.e., first outer layer (food contact)/oxygen barrier/outer abuse layer.

The inner layer of the inventive film is subjected to a surface activation treatment, such as by corona discharge. This layer is then coated with an aqueous solution comprising at least a colorant and/or flavorant and a peeling aid, such as a liquid smoke solution, a caramel solution, or a blend of the two. Additional components of the aqueous solution can include, among others, polyethylene glycol, antifoaming agents, surfactants, gelling agents, spot prevention agents, and pH adjusting chemicals such as sodium hydroxide, each ingredient providing properties as are all well-known in the art. Additional processing aids may also be included. However, binding agents used in other formulations that allow aqueous liquid smoke, etc. solutions to adhere to the surface of plastic casings are not necessary in the inventive film. Once the film is treated with this solution, it is dried to a moisture level in the range of less than about 5 wt. %, preferably from about 2 to about 5 wt. %, substantially lower than currently available films with moisture levels of 30 to 60 wt. %. The film must also have KCOF values that confirm that the film will slide over the tube forming parts of form and fill machines The preferred use of the inventive flat film is on an automatic form and fill machine that continuously pulls the film forward and slides it over a horn or shoulder that curves the film, thereby turning it into a tube, and sealing together the two edges of the tube using a sealing strip and welding it to the outer layer of the tube, forming a sealed, tubular casing. One example of a sealing strip is that of a layer of polyethylene. A preferred sealing strip is made of the same component layers as is the film being sealed. In the preferred film, the outer polyethylene layer of the sealing strip is the same polyethylene as is used in the film. This sealing strip is applied with its polyethylene side placed against the outer polyethylene layer of the formed tube and heat-welded. The sealed edges may be abutted or slightly overlapped, depending on various factors, such as the film slipping slightly while being formed into a tube. The amount of tubular casing that can be continuously formed is substantially greater in length than previously known shirred sticks of casing. Next, the formed casing then is stuffed with foodstuffs on these automated machines and the finished products are further cooked and processed. Downtime of the automated machines is substantially reduced on the manufacturing floor, as compared to when shirred sticks of casing are used, thereby reducing the manufacturers cost of producing the final products. Currently, 3,000 foot rolls of the inventive film can be made and supplied to the ultimate customer, as compared to comparable shirred sticks having total lengths of less than 200 feet. The length of the rolls of flat film can be adjusted to the amount preferred by the customer, based on the capabilities of the particular machinery being used. In comparison, the much shorter shirred sticks must be changed many times to provide the same amount of casing as one roll of flat film. Once the casing is stuffed, the product is then further processed by cooking. During the cooking cycle, the additive on the inner layer transfers from the inner layer of the casing to the outer surface of the cooked product, delivering the desired flavoring and/or coloring to the finished product. In tests described later in this document, it was found that the additive was released from the casing to the extent that none is visible on the casing. No or no appreciable amount of additives are absorbed into the film.

Although the inventive film is described as having five layers, more or fewer layers may be used if desired. For example, if different moisture or oxygen barrier properties are desired, additional interior layers may be added to the film, in a manner that is well known to those skilled in the art. In one example of this, it is known that the oxygen barrier layer can comprise any suitable material or blends of such materials, as for example, nylon; ethylene vinyl alcohol; polypropylene; polyester; or a polyvinylidene chloride, and is preferably positioned between the inner layer and the outermost polyethylene layer, possibly adjacent to the above described polyamide layer, with or without an additional adhesive layer. Another example is that of a second moisture barrier layer adjacent to the outer polyethylene layer. Alternatively, coextruded thermoplastic layers placed next to each other while still hot, allows the layers to "melt" or bond with each other. In this case, the adhesive layers may not be necessary, resulting in a two, three, or four layered film. A multilayered thermoplastic film comprising a first outer thermoplastic layer, a second inner thermoplastic layer, and a third outer thermoplastic layer; wherein said second inner thermoplastic layer comprises an oxygen barrier; and said third outer thermoplastic layer comprises a moisture barrier and abuse-resistant layer is also an example of the inventive film with less than five layers.

A preferred embodiment of the present inventive film consists of the following layers: first outer layer of a polyethylene; a second inner layer of adhesive; the third inner layer of bioriented nylon 6; a fourth inner layer of an adhesive; and a fifth outer layer of polyethylene, this being the second outer layer of the film. The film layers may be represented as: polyethylene/adhesive/nylon 6/adhesive/polyethylene. Variations of the order of the layers may be made as known to those skilled in the art, but once formed into a tubular casing, the inner thermoplastic layer must be the interior layer that is adjacent to the foodstuff and the outer layer, preferably polyethylene, for its barrier, abuse-resistance, and melt properties.

The second inner layer is an adhesive or "tie" layer. Various adhesives are well-known in the art and can be used to adhere the inner layer to the polyamide layer. In particular, it has been found that a polyurethane-based adhesive is a preferred adhesive, as it prevents delamination from the nylon layer after the food is processed, insuring that all of the film is removed from the surface of the processed foodstuff. Other adhesives may be used in this adhesive layer, as are well-known in the art.

The third inner layer is preferred to be a bioriented polyamide, and particularly bioriented nylon 6. Polyamides are well-known in the art as film layers. Polyamides and co-polyamides, such as nylon 6/66, are useful for providing both a measure of strength and for oxygen barrier properties to the film. Polyamides are polymers having recurring amide (—CONH—) linking units in the molecular chain. They include nylon resins which are well known polymers having a multitude of uses including utility as packaging films, bags, and casings. "Nylon" is a generic term for synthetic, high molecular weight (MW 10,000) linear polyamides.

Suitable nylons are commercially available and may be prepared by well-known methods including addition or self-condensation reactions, e.g., of amino acids or lactams and condensation reactions of diamines with diacids. Nylon polymers may be aliphatic, aromatic, or amorphous. Suitable nylon polymers may be homopolymers or copolymers such as bipolymers and terpolymers, and blends and modifications thereof. Suitable nylons for use in the present inventive film include nylon 6, nylon 6/12 copolymer, nylon 6/66 copolymer and blends thereof. The especially preferred polyamides are aliphatic nylons such as nylon 6. Nylon films may be biaxially stretched, producing bioriented (in both the machine and transverse direction of the film) films.

The fourth inner layer is an adhesive tie layer between the third inner nylon layer and the fifth outer polyethylene layer and may be the same or different from the second tie layer. It may also be any other adhesive well-known to those skilled in the art of producing laminated films.

The fifth outer layer is preferably both an abuse-resistant layer and a moisture barrier layer. Abuse-resistant layers are needed to withstand contact with sharp objects and provide abrasion resistance. In the present invention, this abuse-resistant layer is also the heat sealable layer. As an exterior surface layer of the film, this is the outermost layer of the tubular film and is therefore subject to handling and abuse e.g. from equipment during packaging and from rubbing against other surfaces during the production of cooked food products. This contact causes abrasive forces, stresses, and pressures which may abrade away the film causing punctures or breaches in the integrity of the package, causing loss of food product due to contamination. Therefore, the exterior surface layer is typically made from materials chosen to be resistant to abrasive and puncture forces and other stresses and abuse which the packaging may encounter during use. Generally, the exterior surface layer should be easy to machine (i.e. be easy to feed through and be manipulated by machines when being formed into tubular casings and stuffed with food emulsions). Suitable stiffness, flexibility, flex crack resistance, modulus, tensile strength, coefficient of friction, printability, and optical properties are also frequently designed into exterior layers by suitable choice of materials. This preferred layer of polyethylene was chosen because it has characteristics suitable for creating desired heat seals using overlap seals or having the seal welded with a sealing strip.

People skilled in the art generally refer to several broad categories of polymers and copolymers as "polyethylene." Placement of a particular polymer into one of these categories of "polyethylene" is frequently based upon the density of the polyethylene and often by additional reference to the process by which it was made since the process often determines the degree of branching, crystallinity, and density. In general, the nomenclature used is nonspecific to a compound but refers instead to a range of compositions. This range often includes both homopolymers and copolymers. For example, "high density" polyethylene ("HDPE") is ordinarily used in the art to refer to both (a) homopolymers of densities between about 0.960 to 0.970 g/cm$^3$ and (b) copolymers of ethylene and an α-olefin (usually 1-butene or 1-hexene) which have densities between 0.940 and 0.958 g/cm$^3$. HDPE includes polymers made with Ziegler or Phillips-type catalysts and is also said to include high molecular weight "polyethylenes." In contrast to HDPE, whose polymer chain has some branching, are the "ultra-high molecular weight polyethylenes," which are essentially unbranched specialty polymers having a much higher molecular weight than the high molecular weight HDPE.

Throughout this document, the term "polyethylene" is used (unless indicated otherwise) to refer to ethylene homopolymers as well as copolymers of ethylene with α-olefins, and the term will be used without regard to the presence or absence of substituent branch groups.

Another broad grouping of polyethylene is "high pressure, low density polyethylene" ("LDPE"). LDPE is used to denominate branched homopolymers having densities between 0.915 and 0.930 g/cm$^3$ as well as copolymers containing polar groups resulting from copolymerization e.g. with vinyl acetate or ethyl acrylate. LDPEs typically contain long branches off the main chain (often termed "backbone") with alkyl substituents of 2 to 8 carbon atoms.

In the 1970's a new grouping of polyethylene was commercialized-linear low density polyethylene ("LLDPE"). Only copolymers of ethylene with α-olefins are in this group. LLDPEs are presently recognized by those skilled in the art as having densities from 0.915 to 0.940 g/cm$^3$. The α-olefin utilized is usually 1-butene, 1-hexene, or 1-octene and Ziegler-type catalysts are usually employed (although Phillips catalysts are also used to produce LLDPE having densities at the higher end of the range).

In the preferred embodiment, the fifth layer (the second outer layer) is made of polyethylene, selected from the group consisting of LDPE, LLDPE, and a blend of LDPE and LLDPE. The particularly preferred polyethylene is selected from the group consisting of LDPE having a density from about 0.924 to about 0.925 g/cm$^3$, LLDPE having a density of about 0.916 g/cm$^3$, and a blend of LDPE and LLDPE.

Color concentrates can be added to the polyamide or polyethylene layers, thereby producing colored casing. Colored casing is preferred by certain manufacturers for a number of reasons, such as for identification purposes or to more easily spot any bits of casing that haven't peeled off of the final processed foodstuff.

Film of the present invention may be made by slot cast extrusion, or by lamination with orientation, e.g. by tentering. Another way of making the inventive film is by using a method for biaxially orienting the nylon layer in which a primary tube is formed by melt extruding a tube from an annular die. The primary tube can be made by any of the known techniques for extrusion of tubular plastic film including extrusion and coating lamination methods. This extruded tube is cooled, collapsed, and then inflated between a first and second means for blocking the interior of the tube which means are set apart from one another to form an isolated fluidic mass or bubble, and the inflated tube is advanced through a heating zone to bring the tube to its draw temperature. In a draw or orientation zone the tubing is radially expanded in the transverse direction and pulled or stretched in the machine direction at a temperature such that expansion occurs in both directions (preferably simultaneously)—the expansion of the tubing being accompanied by a sharp, sudden reduction of thickness at the draw point. The term "heating zone" is used to define a region which includes both a zone of preliminary heating of the primary tubing to the draw temperature and also the draw or orientation zone. Once made, the extruded tube is slit to form a flat film that can then be attached to the first inner and outer polyethylene layers with adhesive.

In a preferred extrusion double bubble process of the type described in U.S. Pat. No. 3,456,044, the nylon tube leaving the die is inflated by admission of air, cooled, collapsed, and then preferably oriented by reinflating to form a secondary bubble with reheating to the film's orientation (draw) temperature range. Machine direction ("MD") orientation is produced by pulling or drawing the film tube e.g. by utilizing a pair of rollers travelling at different speeds and transverse direction ("TD") orientation is obtained by radial bubble expansion. The oriented film is set by rapid cooling. Suitable MD and TD stretch ratios are from about 3:1 to about 5:1 with a ratio of about 4:1 preferred. As above, the resulting tube is slit and laminated to the first outer layer with the use of the tie layer. The polyethylene layer can be made by slot cast extrusion or by the conventional blown film method as is well-known in the art. The flat die or slot cast process includes extruding polymer streams through a flat or slot die onto a chilled roll and subsequently winding the film onto a core to form a roll of film for further processing. In the present case, polyethylene is melt extruded through the slot die, ultimately producing a flat sheet of film. This film may be then adhered, or "tied", to the nylon layer with adhesive. Coextrusion of the polyethylene layer and the adhesive layer may also be done and these coextruded film layers would be further adhered to the nylon layer of the film. Coextrusion of multiple layers or all of the layers is also possible, depending on the coextrusion equipment available.

Adhesive or tie layers are not necessary if, for example, a flat extruded polyethylene layer is placed directly next to the nylon layer and the hot polyethylene adheres to the nylon layer, and they adhere to each other.

The first outer layer of the inventive film is subjected to a surface activation treatment resulting in a surface activity of less than 50 Dynes, and in the range of about 10 to about 55% above the Dyne level of the base film before being subjected to any kind of surface activation treatment. Plastics have an inherent level of surface activity that is not enough on their own to cause solutions to adhere to their surface. It has been found that this treatment at this level surprisingly and unexpectedly provides a surface onto which the additive solution may be applied without pooling or migration, as typically happens when aqueous solutions are placed on thermoplastic films. And equally unexpectedly, the coated film readily releases the additive to the surface of the meat, resulting in a well-colored or flavored meat. In contrast, polyamide films do have a small capacity for absorbing aqueous liquids. However, when an inner polyamide layer of a casing has absorbed an aliquot of liquid smoke and is stuffed with meat and further processed, the color transfer to the encased meat is poor, resulting in a lightly colored meat. Polyolefins and other non-polyamide films are known not to absorb any aqueous solution into their surfaces, but rather, the solutions will pool and slide off the films, unless a binding agent is added to these aqueous solutions. The binding agent insures that the additive stays attached to the inner film layer.

Suitable modes of surface activation treatments may include plasma, flame, corona discharge, gamma irradiation and the like. The surface may also be treated chemically. The preferred mode of treatment is that of corona discharge.

As stated above, corona discharge has been used on multilayer plastic films having an olefinic inner layer in order to improve the degree of adhesion between the film and the enclosed meat. The Dyne level reached must be a particular level depending on the plastic of the inner layer, so there is enough adhesion of a particular coating. For polyethylenes, the surface energy of the film is between about 40 to 50 Dynes. But if the Dyne level is greater, the film cannot be removed cleanly from the meat, with bits of meat being pulled off the final product, making it noncommercial. It is also known that certain Dyne levels are needed on thermoplastic films in order to allow inks to adhere to the surface of the film and remain on the film and not transfer to the food when the film is removed from the food product.

Once the layers have been laminated together and the inner layer's surface energy has reached a level of less than 50 Dynes, but in a range of from about 10 to about 55% above the base level of the untreated film, an aqueous additive flavoring and/or coloring solution is applied to the inner layer. This solution comprises coloring and/or flavoring agents, such as liquid smoke or caramel, water, and a peeling agent, and optionally, other processing aids.

It is known in the art that ease of peeling of the casing, particularly for skinless frankfurters, is directly related to skin formation and production of a liquid layer or coating between the casing and the "skin" of the sausage. Under some conditions, peeling the casing from the processed sausage has presented problems, particularly in the production of so called "skinless" frankfurters where large numbers of the product are involved and especially in commercial operations using high-speed automatic stuffing and peeling machines. When the casing is removed from the meat mass by automatic high-speed peeling machines, there is occasionally a tendency for some meat to adhere to the casing and be torn from the sausage with the casing, thereby causing surface marring of the sausage. In other instances, variations in the meat emulsion formulations or in the processing conditions can result in a degree of adherence of the casing to the product which hinders rapid removal of the casing from product encased therein. The use of high-speed, automatic peeling machines in commercial operations, for example, as disclosed in U.S. Pat. Nos. 2,424,346, 2,514, 660, 2,686,927, 2,757,409, 3,312,995, 3,487,499, and 3,608, 973, makes it particularly essential that there be minimal resistance to the separation of casing from sausage, or the product will jam at the peeler or go through unpeeled. Less than complete removal of the casing necessitates the expense and inconvenience of hand sorting and peeling. This also applies to the situation when larger-sized meat products are made. Adhesion of the casing to the processed meat product results in defective products, from the manufacturer's viewpoint, and increases the cost of production due to excess waste.

Many attempts have been made to provide casings having easy release characteristics. It is known in the art, as disclosed, for example, in U.S. Pat. Nos. 2,901,358, 3,106, 471, 3,158,492, 3,307,956, 3,442,663, and 3,558,331, that the application of certain types of coatings to the inside wall of food casings may afford improvement in the release characteristics of the casing from the encased sausage product. Use of peeling aids or release coatings have helped to overcome these peelability problems. Following cooking, cooling, and hydrating, water-soluble cellulose ether containing peeling aids help release the casing from the frankfurter skin by formation of a slippery layer between the casing and the frankfurter skin. Peeling aids are well known in the art and include, but are not limited to, substances such as carboxymethyl cellulose, hydroxypropyl cellulose, lecithin, and various waxes including paraffins, beeswaxes, and natural waxes.

Typical water-soluble cellulose ethers which may be employed are the nonionic water-soluble alkyl and hydroxyalkyl cellulose ethers such as, methylcellulose, hydroxypropyl methylcellulose, hydroxypropylcellulose, ethyl methylcellulose, hydroxyethylcellulose and ethyl hydroxyethylcellulose and preferably the anionic water-soluble cellulose ethers such as, carboxymethylcellulose and carboxymethyl hydroxyethylcellulose. Mixtures of nonionic and anionic water-soluble cellulose ethers may also be employed. Commercially, carboxymethylcellulose ("CMC") and carboxymethylhydroxyethylcellulose are almost always sold as the sodium salt, and it is well established trade practice not to refer to the commercial product as the sodium salt. For the purpose of this application, reference to these anionic materials shall include salts thereof, e.g., the sodium salt and other alkali metal salts thereof.

The amount of water-soluble cellulose ether, and the other possible peeling aids, present on the internal surface of food casings can vary over a wide range, although very small quantities are actually required. In comparison, for the present invention, natural peeling aids, such as waxes, may be used in concentrations ranging from about 1.0 wt. % to about 13.0 wt. % of the final coloring and/or flavoring solution, with a preferred amount being in the range of about 3.0 wt. % to about 13 wt. %. As with all peeling aids, the amounts of these types of peeling aids used in the coloring and/or flavoring solutions will depend on the type of food emulsions or formulations and processing conditions encountered.

One coloring solution that imparts a level of brown color to the final processed product and that may be applied to the inner layer is an aqueous caramel solution of water, caramel, and a peeling aid. A general formula of the caramel solution is from about 15.0 wt. % to about 80.0 wt. % of caramel; from about 2.0 wt. % to about 5.0 wt. % of surfactant; from about 10.0 wt. % to about 40.0 wt. % of propylene glycol; and from about 3.0 wt. % to about 20.0 wt. % of a peeling aid, the solution having a final pH in the range of from about pH 2 to about pH 10. The ultimate formula will depend on the type of caramel used and the desired color of the final product.

A flavoring agent used in the meat industry is liquid smoke, which can also be considered a coloring agent, depending on the type of liquid smoke used. Liquid smoke is also used to give a smoky flavor to the encased meat. Both tar containing and tar depleted liquid smokes may be used on the inventive film. The liquid smoke solution of the present invention comprises an aqueous solution of a peeling aid and liquid smoke. The pH range of liquid smoke solution is in the range of from about 4 to about 14. A liquid smoke solution that is more acidic will be tacky and will jam in the automatic form and fill machines, preventing the tubing from being formed. A particularly preferred pH range of the liquid smoke solution is from about 5 to about 6. Additional components of the solution may include propylene glycol, 25% sodium hydroxide to adjust the pH of the solution, and an antifoaming agent.

A liquid smoke solution of the present invention consists of from about 4.5 to about 70.0 wt. % water; from about 4.0 to about 35.0 wt. % propylene glycol; from about 1.0 to about 15.0 wt. % of 25% sodium hydroxide as needed to adjust the pH of the solution; liquid smoke from about 60.0 to about 80.0 wt. %, and peeling aid from about 3.0 to about 20.0 wt. %, and about 1.0 wt. % of antifoam.

A preferred liquid smoke solution consists of from about 4.5 to about 15.0 wt. % of water; from about 4.0 to about 12.0 wt. % of propylene glycol; from about 1.0 to about 10.0 wt. % of 25% sodium hydroxide; from about 60.0 to about 71.0 wt. % of liquid smoke; from about 5.0 to about 20.0 wt. % of a peeling aid; and about 1.0 wt. % of an antifoam agent.

A particularly preferred liquid smoke solution contains from about 5.0 to about 8.0 wt. % of water; from about 4.0 to about 8.0 wt. % propylene glycol; about 1.0 wt. % of 25% sodium hydroxide; from about 60.0 to about 80.0 wt. % of liquid smoke; from about 10.0 to about 20.0 wt. % of a peeling aid; and about 1.0 wt. % of an antifoam agent, the solution having a pH of from about 4 to about 6.

These solutions may be applied to the inner layer of the film in any number of ways. The solution may be sprayed or applied by the blade coating method, a method used where a coating is applied to a paper that is usually supported and carried by a resilient backing roll, using a flexible doctor blade located some distance from and on the trailing side of the applicator, which serves to level the applied coating. In general, an excess of coating material is applied to the paper web, and the trailing blade then meters or removes the excess while uniformly spreading the coating onto the paper's surface (See U.S. Pat. No. 4,250,211, "Paper coating method and apparatus," to Wayne A. Damrau et al., issued on Feb. 10, 1981.) Another method for applying the solution to the inventive film is the rotogravure printing method, wherein an engraved cylinder is coated with the solution, and from the cylinder the solution is transferred to the inner, food contact, corona treated layer of the inventive film. This is an old printing method still in use and well-known to those in the printing arts. Roll coating and other printing methods may also be used to deposit the coloring and/or flavoring solutions onto the inner layer of the film.

Additionally, the solution can be applied from edge-to-edge of the film, coating the total surface. No clean edge is needed to allow sealing to be done. Sealing of the edges to form a tube was able to be done right through the coating on the film. Polyethylene, without the surface activation treatment, picks up none to very little of any aqueous coating. However, in early testing, it was found that the application of coating solutions to the inventive film increased the films weight by about 35 wt. % (measured once the coating had dried), based on the weight of the dry, untreated film, a very surprising result. This amount of coating transfers to the encased meat and delivers a high level of coloring or flavor to the meat, much more than seen from other non-inventive casings.

If the inventive film is coextruded as a tubular film and the inner, food contacting surface undergoes surface activation treatment, the aqueous additives may be applied to the inner layer but well known method of, for example, slugging or spraying.

Once any flavoring and/or coloring solution is applied, the coated film is dried to a finished moisture level of from about 2.0 to about 5.0 wt. % moisture. It also has been found that if the moisture level falls below about 2.0 wt. %, the film becomes brittle and unusable, and if the moisture level is greater than about 5.0 wt. %, the film becomes too tacky and jams the form and fill machine. Additionally, if the moisture level of the film is greater than about 5.0 wt. %, the adhesive of the second layer, between the second inner layer and the polyamide layer, doesn't adhere properly causing the film to delaminate upon use.

The KCOF parameters are related to the slip properties plastic films. Plastic films are measured when the film slides over itself or over another substance. In the present invention, there are three KCOF parameters. The first KCOF is of the first outer layer coated with the aqueous additives to the metal of the turning shoulder of the form and fill machine which is a maximum of 0.500 lbs. The second KCOF is of the outer thermoplastic layer to metal (important when the flat film is turned into a sleeve, or tube, and held under a metal collar of the form and fill machine), which is a maximum of 0.500 lbs. The third KCOF parameter is of the two outer layers to each other and is a maximum of 0.500 lbs.

Furthermore, the inventive film may also be made into tubes conventionally, that is by seaming the edges of the film together, either by abutting or by overlapping the edges, and using e.g. adhesives to seal the edges together or by welding the seam closed by the use of a strip of film made of the same composition as is the inventive film. In this case, the outer layer of the strip is placed adjacent to the formed tube whose outer layer is the same as that of the strip, and welded in place with heat or other melting means. In this manner, tubes of various diameters may be made from the flat film.

The following test methods are referred to in this application and examples.

Experimental results of the following examples are based on tests similar to the following test methods unless noted otherwise:

KCOF is measured on the Coefficient of Friction Tester Model D-1055 made by Kayeness, Inc. of Honey Brook, Pa., using the ASTM D 1894 test method.

Moisture analysis is done using the Mettler Toledo Halogen moisture analyzer model HR73.

L, a, b Test: Hunter L, a, and b values are standard color scale values which indicate differences in brightness, hue and saturation using a standard color system which relates lightness as L values, and hue and croma as a combination of a and b values on a coordinate scale where a represents redness-greenness and b represents yellowness-blueness. L values describe the degree of darkness, where a value of 100 equals white and that of 0 equals black. a-values describe the degree of redness, which increases with an increasing a-value. b-values describe the degree of yellowness, which increases with increasing b-value. Hunter L, a, b and color scale values and opacity may be measured by the following tests.

Encased or peeled sausages or meat stuffs may be tested as is. L, a, and b values and opacity are measured using a colorimeter such as a hand held model colorimeter available from Hunter Associate Laboratory, Inc. of Reston, Va., U.S.A. or the Color Machine Model 8900 available from Pacific Scientific.

Example 1. Preparation of Inventive Film and Meat Processing Steps

The inventive film used was a flat laminate structure with the layers being LLDPE/polyurethane adhesive/bioriented nylon 6/polyurethane adhesive/LLDPE. The first outer LLDPE layer was treated by corona discharge to a surface energy of 46-48 Dynes prior to coating with a liquid smoke solution.

The film was wound tightly on a roll and placed on a rotogravure applicator. A liquid smoke solution was prepared and applied to the inner layer by the gravure applicator. The solution composition used was: 5 wt. % water, 9 wt. % polyethylene glycol, 8 wt. % 25% NaOH, 66 wt. % liquid smoke, 11 wt. % peeling aid, and 1 wt. % antifoaming agent, the solution having a pH of 5.8. The application speed for the liquid smoke solution was 10 meters/minute. The film was dried in an oven having a temperature of from 250 to 275° F. without the use of infrared heating. The resulting film had a finished moisture level of 3+/−1 wt. %. The KCOF of the liquid smoke-containing first outer coated layer to metal was 0.500 lbs. maximum, the KCOF of the fifth outer polyethylene layer to metal was 0.500 lbs. maximum, and the KCOF of the two outer layers was 0.500 lbs. maximum. These values indicated that the liquid smoke containing film would track smoothly on the Poly-Clip TSC A-200 form and fill machine, an automated machine that can use the inventive flat film to automatically form and weld-seal tubular casing, stuff it with meat emulsion thereby forming "chubs" of meat product, such as deli meats, and which clips shut both the leading and tail ends of the chubs of meat.

The inventive film was formed into food casing by hand forming it into a tube with slightly overlapping edges that were heat sealed together with a sealing strip. The sealing strip was of a similar composition as that of the laminated film, except that it was only a 3-ply film—LLDPE/urethane adhesive/polyamide 6. This sealing strip was applied with the LLDPE side adjacent to the outside seam of the formed tube, the LLDPE layer, and it was heat welded to create an overlapped seam using the AIE-RS2 Constant heat hand roller sealer. This tubular casing and the control casings described below were then hand-stuffed with a turkey breast meat emulsion and cooked and processed, and ultimately, removed from the chubs, which chubs were then inspected for color transference. Control casings included the inventive film as described above, but without any colorant or flavorant coating, resulting in a clear film. Another control was a commercial product sold by Viskase Companies, Inc., Darien, Ill., USA, under the registered trademark "Viscoat® Smoke Master®", being a laminated thermoplastic film with an absorbent inner paper layer coated with liquid smoke. A third control used was of the same film as the Viscoat® Smoke Master®, but without any type of colorant, such as liquid smoke or caramel.

Color Transfer.

Four control casings and one inventive film sample were tested for color transference from the casing to the processed food. Testing was done using the L, a, b test as described above.

TABLE 1

| | Color L, a, b Values | | | |
|---|---|---|---|---|
| Samples (turkey) | Size of casing chub (mm) | L | a | b |
| Clear Viscoat control | 115 | 81.20 | −2.20 | 12.70 |
| Viscoat Smoke Master control | 115 | 52.60 | 12.20 | 30.50 |
| Clear inventive casing control | 73 | 78.70 | −0.80 | 15.30 |
| Inventive film containing liquid smoke | 73 | 41.60 | 14.2 | 23.60 |
| Clear inventive casing control | 108 | 79.70 | −1.40 | 14.90 |

Visually and colorimetrically, the chubs made from the liquid smoke coated inventive film were darker, slightly redder, and more yellow than those made from the Viscoat® Smoke Master® control film.

Example 2. Surface Activation

The inventive film was prepared as described in Experiment 1 above. Two samples of the film were used: one with and the other without a liquid smoke coating applied to its surface. Both samples had their first outer layer treated by corona discharge and the fifth outer layer in each was left untreated. These surfaces were tested for their Dyne levels. "Con-Trol-Cure® Liquid Dyne Pens" were used to test for the Dyne levels. These pens contain inks that when wetted by the subject material and then run across the subject material drawing a line, indicate the Dyne level by the integrity of the line created and held on the material's surface for two seconds or more.

The results are shown below:

TABLE 2

| Dyne Test | | |
| --- | --- | --- |
| | Inner layer treated with liquid smoke (Dyne level) | No liquid smoke treatment (Dyne level) |
| Inner layer (corona treated) | 44 | 46-48 |
| Outer layer (no corona treatment) | 30-32 | 30-32 |

As the outer and inner layers are both polyethylene layers, it is shown here that the liquid smoke treatment of the inner layer does not affect the Dyne level of the outer layer, which is not corona treated. The base Dyne level of the polyethylene layers is shown in the outer layer values, 30 Dynes to 32 Dynes, while the inner layer, when corona treated, has a much higher Dyne level of 46Dynes to 48Dynes, and when this corona treated inner layer is coated with a liquid smoke solution, the Dyne level drops only slightly to 44 Dynes.

Example 3. Comparison of Absorbed Vs. Coated Films

The inventive film coated with liquid smoke as described in Experiment 1 was compared to a commercially available film, "Smoke Coat®", sold by Vector USA Inc. of Oak Brook, Ill., USA, who also are the owners of the registered trademark. Smoke Coat is a film having a nylon inner layer on which liquid smoke has been introduced and absorbed to some degree into the film. The liquid smoke is known to transfer to some degree to the surface of meat cooked inside the tubular film. Both the inventive film and the Smoke Coat film were tested for color using a Hunter Miniscan XE Plus colorimeter. The machine was calibrated with standard tiles and then each thermoplastic film sample was placed onto the working plate of the colorimeter and four readings were taken with an average value reported in Table 3 below. Next, each sample was washed with propylene glycol, air dried, and tested again with the colorimeter.

TABLE 3

| Absorbed vs. Coated Films | | | |
| --- | --- | --- | --- |
| | L | a | b |
| Inventive film with no coating control | 90.13 | −1.11 | 0.78 |
| Inventive film with liquid smoke coating | 58.38 | 11.38 | 28.09 |
| Inventive film - washed | 89.36 | −1.6 | 5.15 |
| Smoke Coat with absorbed liquid smoke | 88.84 | −1.59 | 8.2 |
| Smoke Coat - washed | 88.02 | −1.85 | 9.97 |

There is a substantial difference in the L, a, and b readings in the inventive film before and after washing. These results show that the liquid smoke coating has been washed off the surface. The L, a, and b readings of the Smoke Coat with the absorbed liquid smoke remained nearly the same both before and after being washed, showing that the liquid smoke was absorbed into the nylon film layer and not available for transfer from the film to any encased meat product. Additionally, the decrease in the L value between the control having no liquid smoke coating and the coated inventive film indicates the large percentage of coating on the film. The same applies to the difference between the coated inventive film and the Smoke Coat film with liquid smoke.

All patents cited above are hereby incorporated by reference.

The above examples are illustrative only, and should not be interpreted as limiting since further modifications of the disclosed embodiments will be apparent to those skilled in the art in view of this teaching. All such modifications are deemed to be within the scope of the invention disclosed herein. It is intended that the scope of the invention be defined by the claims appended hereto, and their equivalents.

The invention claimed is:

1. A multilayered thermoplastic film, comprising:
   a first outer non-nylon thermoplastic layer treated by surface activation, having a surface activation energy of between about 40 Dynes to about 50 Dynes, and comprising an aqueous solution selected from the group consisting of a coloring solution, a flavoring solution, and a coloring and flavoring solution;
   a second inner thermoplastic layer; and
   a third outer thermoplastic layer,
   the Kinetic Coefficient of Friction of the third outer thermoplastic layer to metal being a maximum of 0.500 lbs,
   the Kinetic Coefficient of Friction of the first outer non-nylon thermoplastic layer to metal being a maximum of 0.500 lbs,
   the Kinetic Coefficient of Friction of the first outer non-nylon thermoplastic layer to the third outer thermoplastic layer being a maximum of 0.500 lbs,
   the multilayered thermoplastic film being a flat film with the first outer non-nylon thermoplastic layer as an exterior layer and with the third outer thermoplastic layer as another exterior layer, and
   the multilayered thermoplastic film having a finished moisture level from about 2.0 wt. % to about 5.0 wt. %.

2. The multilayered thermoplastic film of claim 1, wherein the first outer non-nylon thermoplastic layer and the third outer thermoplastic layer comprise a thermoplastic selected from the group consisting of polyethylene, low density polyethylene, linear low density polyethylene, and blends of low density polyethylene and linear low density polyethylene.

3. The multilayered thermoplastic film of claim 1, wherein the surface activation energy of the first outer non-nylon thermoplastic layer is from about 10% to about 55% above a base level of the multilayered thermoplastic film without a surface activation treatment.

4. The multilayered thermoplastic film of claim 1, wherein the surface activation energy of the first outer non-nylon thermoplastic layer is from about 35 Dynes to about 49 Dynes.

5. The multilayered thermoplastic film of claim 1, wherein the second inner thermoplastic layer comprises a thermoplastic selected from the group consisting of ethylene vinyl alcohols, polypropylenes, polyesters, polyvinylidene chloride, aliphatic nylons, aromatic nylons, nylon homopolymers, nylon copolymers, nylon 6, nylon 6/12 copolymer, nylon 6/66 copolymer, and blends thereof.

6. The multilayered thermoplastic film of claim 5, wherein the second inner thermoplastic layer is selected from the group consisting of the nylon 6, the nylon 6/12 copolymer, the nylon 6/66 copolymer, and blends thereof.

7. The multilayered thermoplastic film of claim 1, wherein the third outer thermoplastic layer comprises a thermoplastic selected from the group consisting of polyethylene, low density polyethylene, linear low density polyethylene, and blends of low density polyethylene and linear low density polyethylene.

8. The multilayered thermoplastic film of claim 7, wherein the third outer thermoplastic layer comprises the low density polyethylene.

9. The multilayered thermoplastic film of claim 7, wherein the third outer thermoplastic layer comprises the linear low density polyethylene.

10. The multilayered thermoplastic film of claim 7, wherein the third outer thermoplastic layer comprises a blend of the low density polyethylene and the linear low density polyethylene.

11. The multilayered thermoplastic film of claim 1, further comprising:
a first adhesive layer between the first outer non-nylon thermoplastic layer and the second inner thermoplastic layer; and
a second adhesive layer between the second inner thermoplastic layer and the third outer thermoplastic layer.

12. The multilayered thermoplastic film of claim 11, wherein adhesive of the first adhesive layer and adhesive of the second adhesive layer are the same.

13. The multilayered thermoplastic film of claim 11, wherein adhesive of the first adhesive layer and adhesive of the second adhesive layer are different.

14. The multilayered thermoplastic film of claim 11, wherein the first adhesive layer and the second adhesive layer comprise a polyurethane-based adhesive.

15. The multilayered thermoplastic film of claim 1, wherein the group consisting of the coloring solution, the flavoring solution, and the coloring and flavoring solution consists of liquid smoke solution, caramel solution, and a blend of liquid smoke and caramel solutions.

16. The multilayered thermoplastic film of claim 15, wherein the liquid smoke solution comprises liquid smoke, water, and peeling aid, the liquid smoke solution having a pH of from about 4 to about 14.

17. The multilayered thermoplastic film of claim 15, wherein the caramel solution comprises caramel, water, and peeling aid, the caramel solution having a pH of from about 2 to about 10.

18. The multilayered thermoplastic film of claim 15, wherein the liquid smoke solution comprises from about 4.5 wt. % to about 70.0 wt. % water; from about 4.0 wt. % to about 35.0 wt. % propylene glycol; from about 1.0 wt. % to about 15.0 wt. % of sodium hydroxide; from about 60.0 wt. % to about 80.0 wt. % liquid smoke; and from about 3.0 wt. % to about 20.0 wt. % peeling aid.

19. The multilayered thermoplastic film of claim 15, wherein the caramel solution comprises from about 15.0 wt. % to about 80.0 wt. % caramel; from about 2.0 wt. % to about 5.0 wt. % surfactant; from about 10.0 wt. % to about 40.0 wt. % propylene glycol; and from about 3.0 wt. % to about 20.0 wt. % peeling aid.

20. A multilayered thermoplastic film, comprising:
a first outer non-nylon thermoplastic layer having a surface activation energy of greater than 40 Dynes and less than 50 Dynes and comprising a solution selected from the group consisting of a coloring solution, a flavoring solution, and a coloring and flavoring solution;
a second inner adhesive layer;
a third inner polyamide layer comprising an oxygen barrier layer;
a fourth inner adhesive layer; and
a fifth outer thermoplastic layer comprising a moisture barrier and abuse-resistant layer,
the Kinetic Coefficient of Friction of the fifth outer thermoplastic layer to metal being a maximum of 0.500 lbs,
the Kinetic Coefficient of Friction of the first outer non-nylon thermoplastic layer to metal being a maximum of 0.500 lbs,
the Kinetic Coefficient of Friction of the first outer non-nylon thermoplastic layer to the fifth outer thermoplastic layer being a maximum of 0.500 lbs,
the multilayered thermoplastic film being a flat film with the first outer non-nylon thermoplastic layer as an exterior layer and with the fifth outer thermoplastic layer as another exterior layer, and
the multilayered thermoplastic film having a finished moisture level from about 2.0 wt. % to about 5.0 wt. %.

* * * * *